Figure 1:
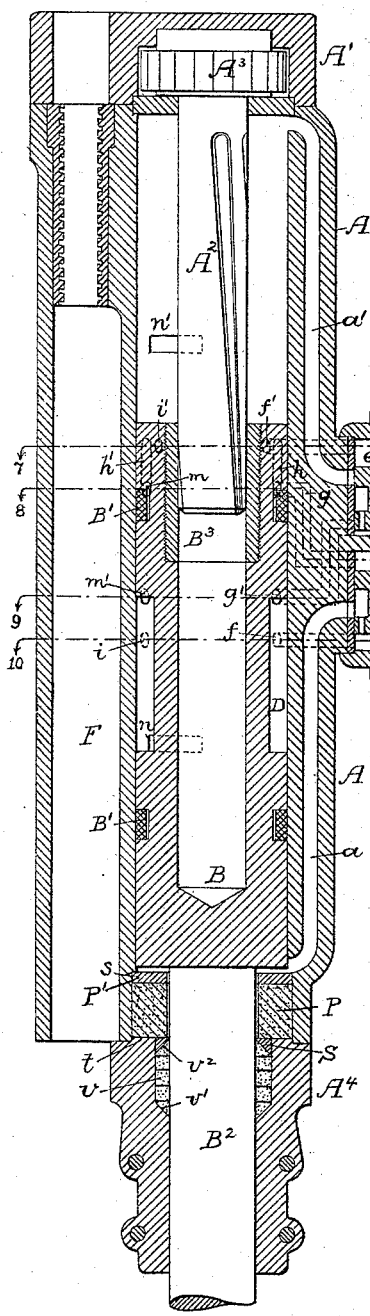

(No Model.) 5 Sheets—Sheet 1.

T. H. PHILLIPS.
IMPACT TOOL.

No. 537,357. Patented Apr. 9, 1895.

Witnesses.
R. Schleicher
Frank E. Bechtold

Inventor:
Thomas H. Phillips
by his Attorneys
Howson & Howson (No Model.)
T. H. PHILLIPS.
IMPACT TOOL.
No. 537,357.
5 Sheets—Sheet 2.
Patented Apr. 9, 1895.
FIG. 3.
FIG. 4.
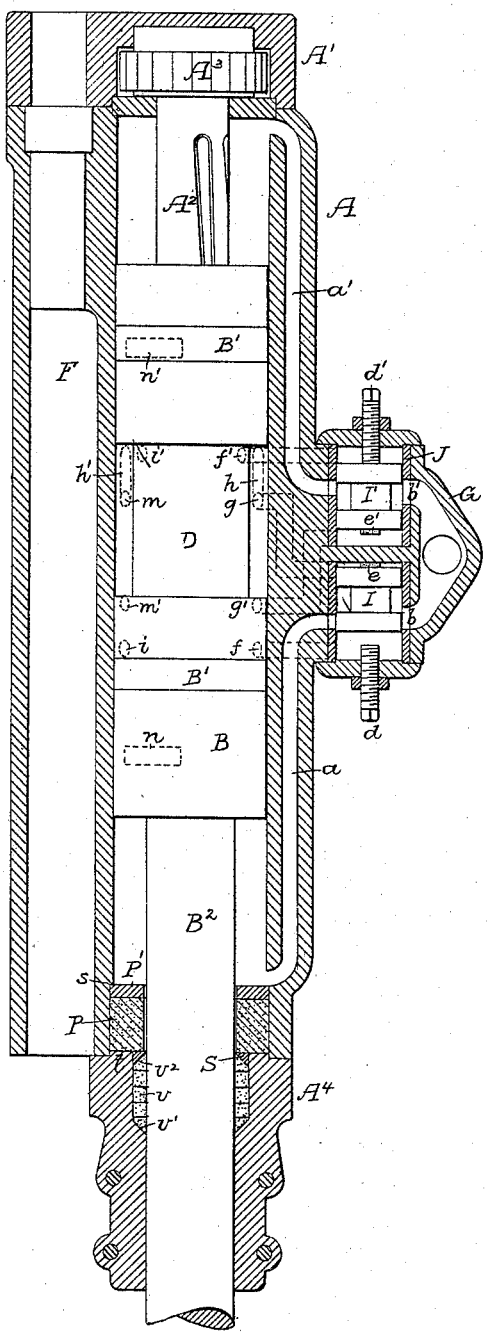
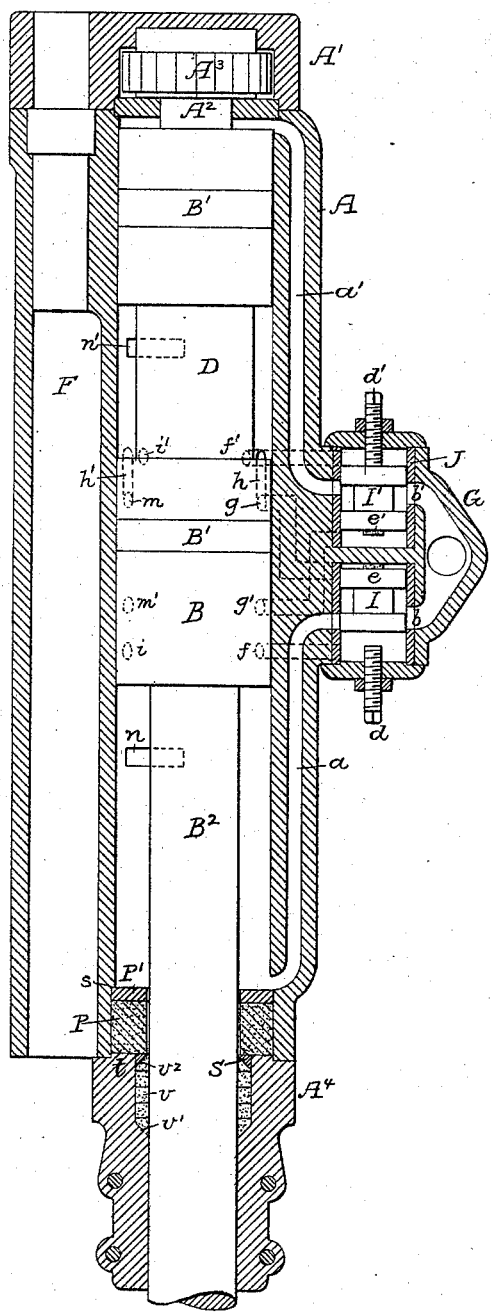
Witnesses:
R. Schleicher
Frank E. Bechtold
Inventor:
Thomas H. Phillips
by his Attorneys
Howson & Howson

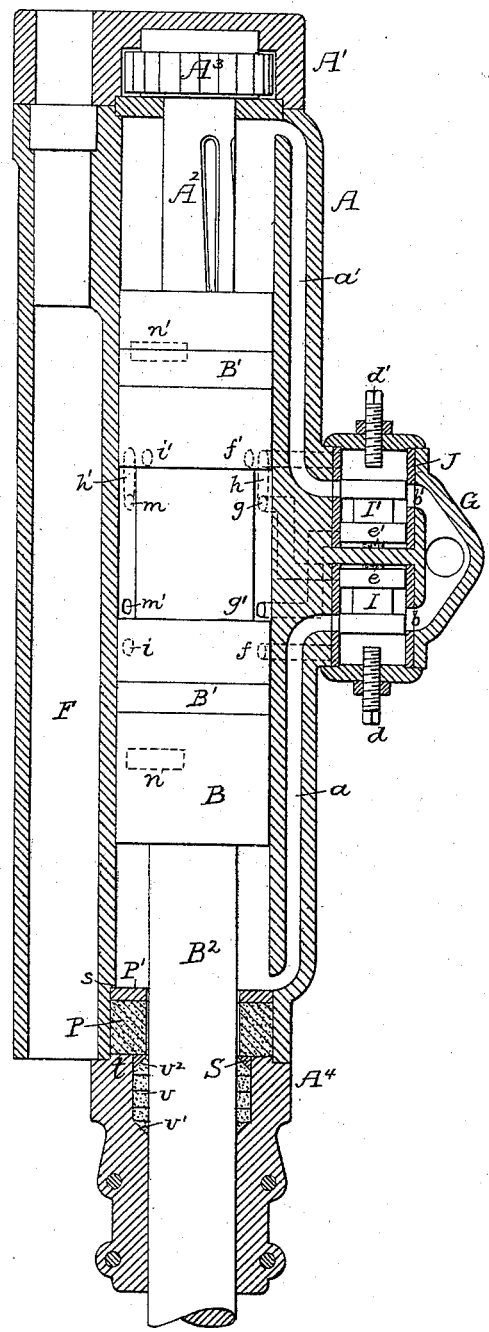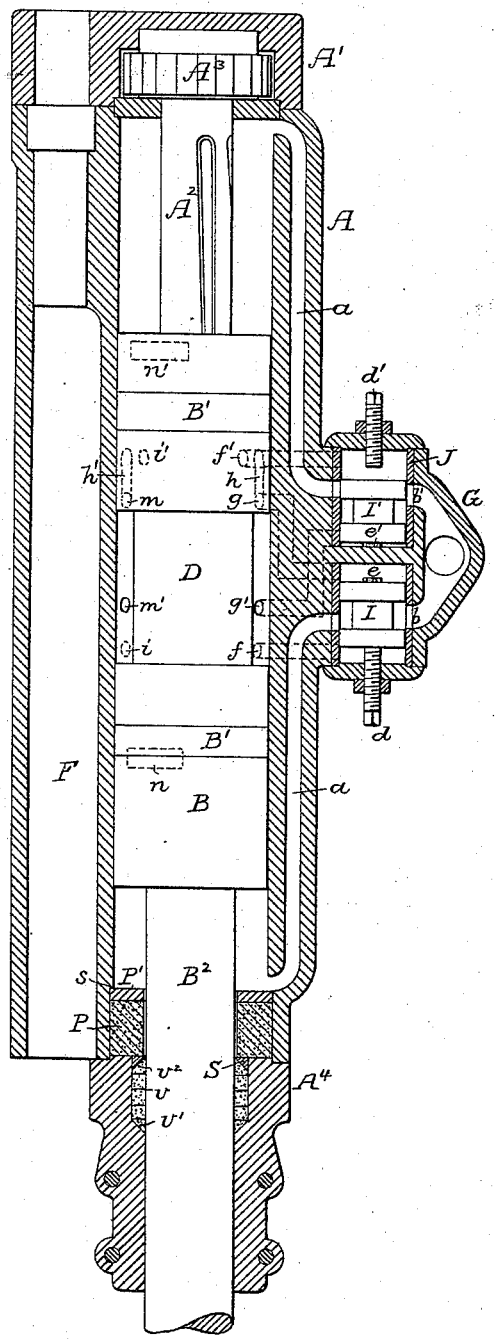

(No Model.) 5 Sheets—Sheet 4.

T. H. PHILLIPS.
IMPACT TOOL.

No. 537,357. Patented Apr. 9, 1895.

Witnesses:
R. Schleicher
Frank E. Bechtold

Inventor:
Thomas H. Phillips
by his Attorneys
Howson & Howson (No Model.)  5 Sheets—Sheet 5.

T. H. PHILLIPS.
IMPACT TOOL.

No. 537,357.  Patented Apr. 9, 1895.

Witnesses:
R. Schleicher
Frank E. Bechtold

Inventor:
Thomas H. Phillips
by his Attorneys
Howson & Howson

UNITED STATES PATENT OFFICE.

THOMAS H. PHILLIPS, OF ST. DAVIDS, PENNSYLVANIA.

IMPACT-TOOL.

SPECIFICATION forming part of Letters Patent No. 537,357, dated April 9, 1895.

Application filed January 2, 1895. Serial No. 533,558. (No model.)

*To all whom it may concern:*

Be it known that I, THOMAS H. PHILLIPS, a citizen of the United States, and a resident of St. Davids, Delaware county, Pennsylvania, have invented certain Improvements in Impact-Tools, of which the following is a specification.

My invention relates to that class of rock drills or other impact tools operated by steam, compressed air, or other motive fluid under pressure, and having a cylinder with reciprocating plunger carrying the drill rod, the flow of motive fluid to opposite ends of the cylinder being controlled by a valve which is caused to move in the valve chamber by opening first one end and then the opposite end of said chamber to the atmosphere, or to suitable exhaust ports, through drainage ports controlled by the plunger, the valve being so constructed that when one end of the valve chamber is opened to the exhaust and the exhaust from the other is cut off, motive fluid is permitted to enter the closed end of the chamber so as to cause the valve to move away from said end.

The objects of my invention are, first, to provide for the use of the motive fluid expansively; second, to obtain an uncushioned blow; third, to cut off the inflow of the motive fluid at an earlier point in the return stroke than in the forward stroke; fourth, to employ a pair of valves, and to lock said valves in their various positions, so that as the motive fluid is cut off from entering either end of the cylinder, it will not be admitted to the opposite end of the cylinder until some additional time has elapsed and the piston has traveled some distance farther in the stroke; fifth, to provide simple and efficient valve cushions and to permit of regulation in the length of stroke of the valve in order to open to any desired extent the ports for the admission of the motive fluid, and, sixth, to provide an automatic and simple method of packing the piston rod and of relaxing the pressure upon the same on the forward movement of the piston. These objects I attain in the manner hereinafter set forth reference being had to the accompanying drawings, in which—

Figure 7:
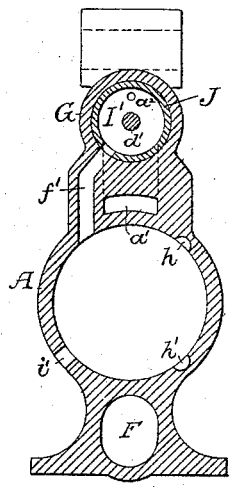
Figure 8:
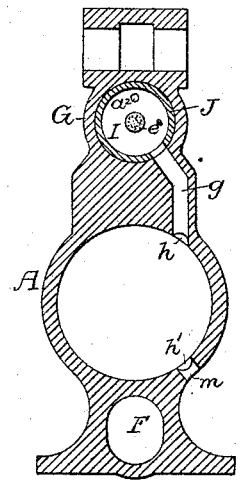
Figure 9:
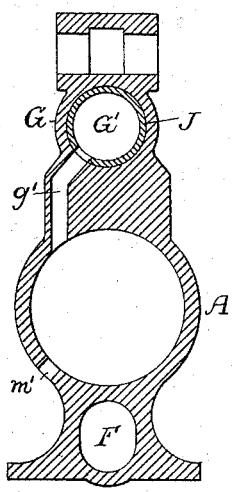
Figure 10:
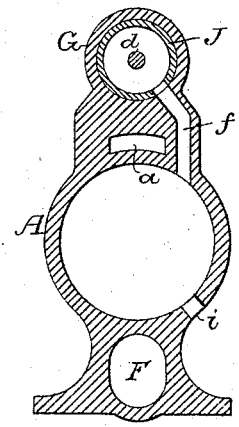
Figure 11:
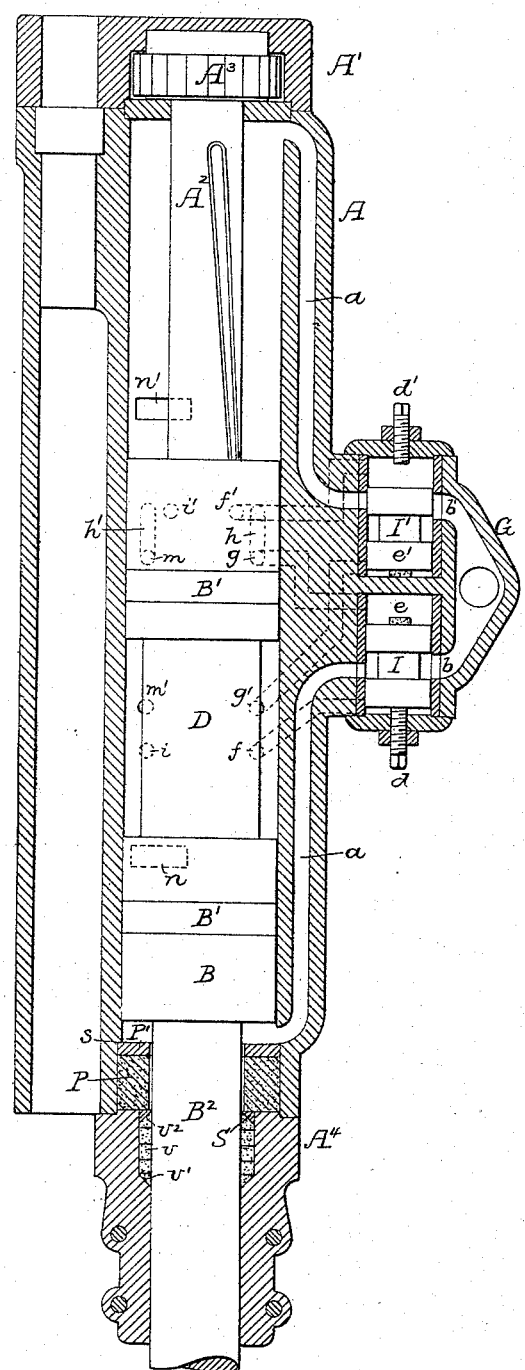
Figure 12:
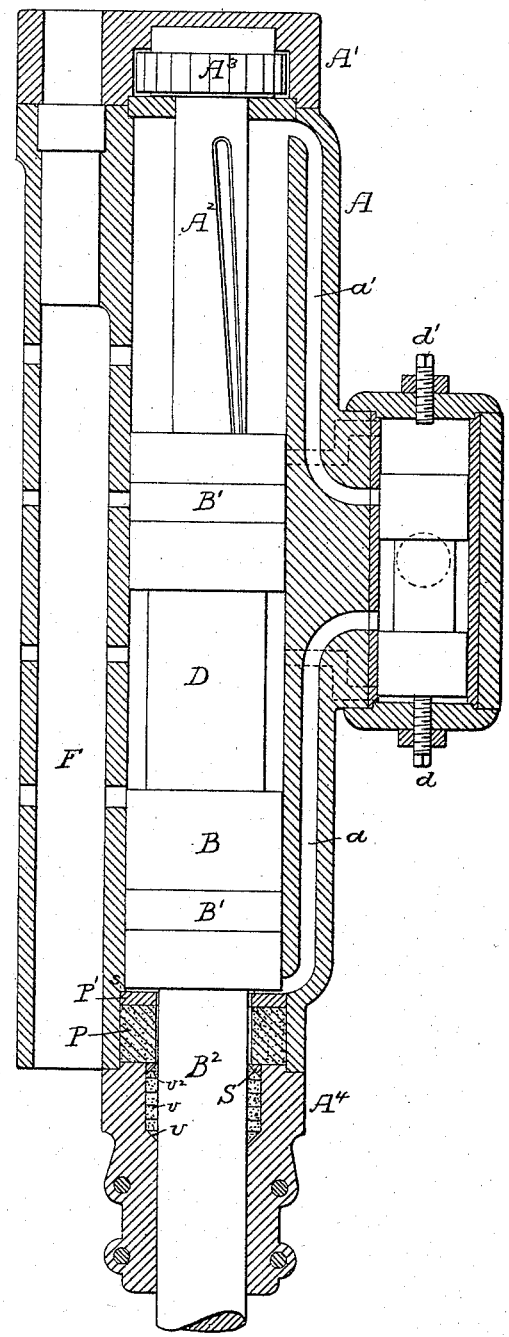

Figure 1 is a longitudinal section, partly in elevation, of sufficient of a rock drill to illustrate my invention. Figs. 2, 3, 4, 5 and 6 are similar views showing the parts in different positions assumed by them during the operation of the drill. Fig. 7 is a transverse section on the line 7—7, Fig. 1. Fig. 8 is a transverse section on the line 8—8, Fig. 1. Fig. 9 is a transverse section on the line 9—9, Fig. 1. Fig. 10 is a transverse section on the line 10—10, Fig. 1; and Figs. 11 and 12 are longitudinal sectional views of other forms of the drill.

A represents the cylinder of the drill which is closed at the rear end by the head A' carrying pawls, pawl springs, ratchet and rifle bar as usual, the front end of the cylinder having a stuffing box for the passage of the piston rod, which stuffing box will be described hereinafter. The cylinder is bored out to receive the piston B which has suitable packing rings B' and a central groove D, and along one side of the cylinder is an opening F for the travel of the usual feed screw, whereby the cylinder is raised and lowered to cause the retraction or advance of the drill fastened to the end of the piston rod $B^2$ which is secured to or forms part of the piston B.

The piston B is hollow for the greater portion of its length and in the rear end there is screwed a nut $B^3$ having a thread for the reception of the rifled bar $A^2$ connected with the ratchet wheel $A^3$ in the back head A' of the cylinder. By means of this ratchet and rifle bar the piston is caused to make part of a revolution at each stroke and consequently the drill strikes a fresh surface at each blow. This construction, however, is common, and forms no part of my invention.

Extending from the forward end of the cylinder to a valve chest G at the side of the latter is a port $a$ and extending from the rear end of the cylinder to said valve chest is a port $a'$, the valve chest being divided by a central partition G' into two valve chambers, one communicating with the port $a$ and containing a valve I and the other communicating with the port $a'$ and containing a valve I', each of these valves being spool-shaped, that is to say, comprising opposite end disks connected by a central web so as to form a central annular groove or passage around the valve.

For convenience of fitting and repair each of the valve chambers is provided with a bushing J, to which the valves fit snugly so as to provide for the proper guidance under all circumstances, but in both disks of each valve is an opening $a^2$ so as to permit a slight leakage of the motive fluid through said disks and into each end of the valve chamber sufficient to cause the valve to move away from either end of the chamber when that end is not in communication with the atmosphere, as hereinafter described.

The inlet for the motive fluid is at the back of the valve chest G and communicates through a port $b$ with the chamber containing the valve I and through a port $b'$ with the chamber containing the valve I' so that the valve I controls the flow of motive fluid to the forward end of the cylinder A while the valve I' controls the flow of motive fluid to the rear end of said cylinder.

To a threaded opening, centrally located in each of the end caps or covers of the valve chest G, is adapted a set screw, that at one end of the chest being represented at $d$ and that at the other end being represented at $d'$, each of these set screws being provided with an appropriate lock nut, and in each end of each of the valves I I' is inserted a block of rubber or other elastic or semi-elastic material, the blocks of the valve I being represented at $e\ e$, and those of the valve I' at $e'\ e'$. Outward movement of each valve is thus arrested by contact of its plug with the inner end of the set screw, while inward movement of either valve is arrested by contact of its plug with the central partition of the valve chest.

The inlet ports $b\ b'$ are of such width and bear such relation to the central grooves of the valves I I' that the port $b$ is always in communication with the groove of the valve I and the port $b'$ with the groove of the valve I'.

The inward movement of either valve serves to close its respective conducting port $a\ a'$ and the outward movement of either valve serves to open its respective conducting port for the passage of the motive fluid, and as such outward movements of the valve are controlled by the set screws $d\ d'$ it will be evident that by properly adjusting these set screws any desired extent of outward movement of either valve, and hence any desired area of opening of either conducting port $a\ a'$ can be insured, and the volume of motive fluid directed to either end of the cylinder, thus accurately regulated.

Leading from the cylinder to the outer end of the chamber containing the valve I is a drainage port $f$ and leading from the inner end of said valve chamber to the cylinder is a drainage port $g$, the latter communicating at its cylinder end with a groove $h$ formed in the inner face or bore of the cylinder.

Extending from the cylinder to the atmosphere or to a suitable exhaust passage formed upon the side of the cylinder A is a port $i$ which is in line with the drainage port $f$, and a similar exhaust port $m$ is in line with the drainage port $g$, said exhaust port $m$ at its inner end communicating with a groove $h'$ in the cylinder, of like character to the groove $h$. Drainage and exhaust ports of similar character, except as regards the grooves $h\ h'$ are employed in connection with the chamber containing the valve I', $f'$ and $i'$ representing respectively the drainage and exhaust ports for the outer end of said valve chamber, and $g'$ and $m'$ the drainage and exhaust ports for the inner end of said chamber, the drainage and exhaust ports for the chamber of the valve I, however, being located on one side of the cylinder and the drainage and exhaust ports for the chamber of the valve I' being located on the opposite side of the same, as will be understood on reference to Figs. 7, 8, 9 and 10, this arrangement being adopted in order to prevent the ports from interfering with each other and to permit of the crossing of the ports $g\ g'$ as indicated by dotted lines in Figs. 1 to 6.

Besides the drainage exhaust ports $i, i'$ and $m\ m'$ there are in the cylinder two cylinder exhaust ports represented respectively at $n\ n'$, these ports, like the drainage exhaust ports, communicating either with the atmosphere or with a special exhaust passage formed upon the side of the cylinder, depending upon whether the motive fluid employed is compressed air or steam. When the special exhaust passage is used, all of the exhaust ports will be located on the same side of the cylinder.

Figure 2:
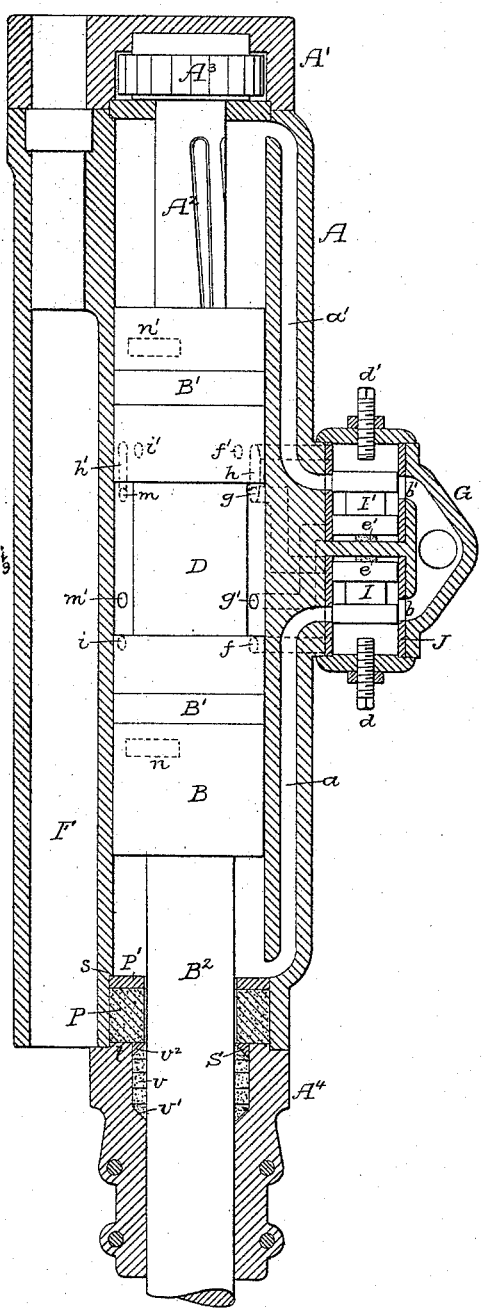

The operation of the device is as follows: Starting with the parts in the position shown in Fig. 1, the piston B is at the forward end of its stroke, the valve I has opened the port $a$ and the valve I' has closed the port $a'$, the outer end of the chamber of the valve I and the inner end of the chamber of the valve I' are open to the exhaust through the drainage ports $f\ g'$, exhaust ports $i\ m'$ and the groove D of the plunger, the exhaust port $n'$ for the rear end of the cylinder is open, the exhaust for the forward end of the cylinder is closed by the forward portion of the piston, and the drainage ports $g\ f'$ and $m\ i'$ are closed by the rear portion of the piston. The motive fluid admitted to the forward end of the cylinder forces the piston rearward therein, and the valves remain in the position shown in Fig. 1 until the ports $f$ and $i$ are closed by the front end of the piston and the ports $g$ and $m$ are opened by the groove D, as shown in Fig. 2. The effect of this is to close the exhaust from the outer end of the chamber containing the valve I and open to the exhaust the inner end of said chamber. Consequently the motive fluid gaining access to the outer and closed end of the chamber will force the valve I inward toward the open end of the chamber so as to close the port $a$ and cut off any further flow of motive fluid to the forward end of the cylinder. (See Fig. 2.) The fluid thus confined in the forward end of the cylinder acts expansively to continue the rearward movement of the piston and there is no further change in the valves until the ports $g'$ and $m'$ are closed and the ports $f'$ and $i'$ opened, as shown in Fig. 3. By this means the inner end of the chamber containing the valve I' is cut off from the exhaust and the front end of said chamber is opened to the exhaust. Hence there is an outward movement of the valve I' so as to uncover the port $a'$ and permit a flow of motive fluid into the rear end of the cylinder A. The piston B continues to move rearward by its momentum and by the expansive force of the motive fluid in front of the same until the exhaust port $n$ is uncovered and passed, as shown in Fig. 4, and the motive fluid escapes from the front end of the cylinder. There has, however, been an admission of motive fluid to the rear end of the cylinder before the piston has moved sufficiently to uncover the port $n$ and this supply of motive fluid acts as a cushion to gradually retard the rearward movement of the piston and prevent it from striking the rear cylinder head. After the motive fluid has escaped from the front of the cylinder and the momentum of the piston has been overcome by the pressure upon its rear end, said piston is forced forward, the valves remaining in the position shown in Fig. 4 until the ports $f'$ and $i'$ are covered and the ports $g'$ and $m'$ uncovered as shown in Fig. 5. This causes a reversal of the conditions previously existing in the chamber of the valve I' and a consequent movement of said valve so as to close the port $a'$ as shown in Fig. 5, thus cutting off the flow of motive fluid to the rear end of the cylinder and permitting said fluid to act expansively during the farther forward movement of the piston. The parts remain in the position shown in Fig. 5 until the ports $g$ and $m$ are closed and the ports $f$ and $i$ are opened, as shown in Fig. 6, thereby effecting a reversal of the conditions previously existing in the chamber of the valve I and causing movement of said valve from the position shown in Fig. 5, to that shown in Figs. 1 and 6 so as to again open the port $a$ and permit a flow of motive fluid into the front end of the cylinder. After the port $n'$ has been uncovered and the motive fluid has escaped from the rear end of the cylinder the motive fluid in the front end of the cylinder acts to drive the plunger rearward and the operations before described are repeated on each successive stroke of the plunger.

In machines of this character as ordinarily constructed the drain holes are equidistant from the center of the machine, this distance and the length of the groove in the piston bearing a certain ratio to the length of the stroke. The full ends of the piston are made equal in length and as much longer than the length of the groove and distance between center of drain holes as is necessary to prevent the drain holes at either end from being uncovered when the piston is at the limit of its stroke at the opposite end of the cylinder. As a consequence of this the motive fluid is admitted to and cut off from the opposite ends of the cylinder at the same point in the stroke, and the fluid is admitted to one end simultaneously with the cutting off of the same from the opposite end. It will be observed on reference to Figs. 1 to 6, however, that the forward end of the piston which I employ is somewhat longer than the rear end, the effect of which in connection with drainage ports located equidistantly from the center of the cylinder as shown, is to cut off the motive fluid sooner on the rear stroke than on the forward stroke, while the use of two independent valves with drainage ports from each end of each valve chamber, permits me to cut off the motive fluid from one end of the cylinder without at the same time admitting it to the other end of the cylinder, and yet provides for the locking of the valves in all of their positions by maintaining pressure at all times on one or other end of the valve. Thus it will be observed that the valve I changes from the position shown in Fig. 1 to that shown in Fig. 2, so as to cut off the motive fluid from the forward end of the cylinder when the piston has traveled rearwardly in the latter to a considerably less extent than it had traveled forwardly when the valve I' was moved from the position shown in Fig. 4 to that shown in Fig. 5 so as to cut off the motive fluid from the rear end of the cylinder, and as the admission of fluid to either end of the cylinder does not occur until a certain time after the cutting off of the fluid from the other end, there is consequently much less cushioning of the piston on the forward or acting stroke than on the rearward or inoperative stroke and hence a correspondingly greater force in the blow delivered by the drill as compared with the ordinary drills having a single governing valve and cushioning the same at both ends of the stroke. In fact, by the use of the independent valves for the different ends of the cylinder and by the relative construction and location of piston ends and drainage ports in the manner described I am enabled to dispense entirely with cushioning at the forward end of the stroke if desired and thus gain all the advantage of both the weight and momentum of the plunger and tool in the force of the blow.

It will be observed that in every position of the plunger one or other end of each valve chamber is open to the exhaust and the opposite end is cut off from the exhaust, the reversal of conditions taking place as to either valve chamber simultaneously, so that there is always pressure of motive fluid on one or other end of each valve. Hence the movement and locking of the valves are positive and there cannot possibly be any dancing or fluttering of either valve, any dropping of either valve by gravity, or any irregularity in the action of the tool due to such irregular movement of the valve.

The grooves $h\ h'$ are employed in order to prevent the closing of the ports $g$ and $m$ by the forward end of the plunger, as the latter moves rearward. In other words, these grooves serve to carry the ports $g$ and $m$ to the same distance from the center of the cylinder as the ports $f$ and $f^2$. It will be observed, moreover, that by the use of the independent inlet and exhaust ports $a$, $n$, $a'$, $n'$, one set for each end of the cylinder, I am enabled to use the motive fluid expansively, a result which is not obtained in machines of this character when the inlet ports $a$ $a'$ are also used for the exhaust.

In carrying out my invention I may in some cases use a piston with ends of equal length, as shown for instance in Fig. 11, the drainage ports being in such case disposed nearer to the forward end than to the rear end of the cylinder, so as to provide for the earlier cutting off of the motive fluid from action on the piston and an earlier admission against the piston on the rearward stroke than on the forward stroke, and I may also attain this latter result in cases where but a single valve is used, as shown for instance in Fig. 12, which will be readily understood without detailed description.

The valves I I' are of the simplest character, each having but a single central groove instead of the multiple-ported or multiple-grooved valves commonly employed in this class of tools.

In order to prevent any injury to the front or forward head of the cylinder in case of an excessive movement of the plunger, I provide against the inner side of the cylinder head $A^4$ a buffer consisting of a ring P of rubber or other elastic material and a washer P' of metal or other rigid material, the latter bearing against an internal rib or shoulder $s$ formed by increasing the bore of the front end of the cylinder so that said rib or shoulder will prevent the washer P' from moving back into the cylinder and will not interfere with the ready removal of the plunger when desired. The head $A^4$ has on its inner face a projection $t$ for entering the enlarged bore of the end of the cylinder and properly centering the head, and said head has a central pocket $v$ with beveled outer end $v'$ for the reception of suitable packing material which is acted upon by a follower S having a beveled front end $v^2$ and constructed to fit snugly both to the opening in the cylinder head and to the piston rod $B^2$.

The cushion ring P and metallic washer P' do not fit snugly to the piston rod. Hence when the motive fluid is admitted to the front end of the cylinder it can leak past said washer and ring so as to act upon the follower S in order to force the same forward and compress the packing against the piston rod so as to prevent any escape of motive fluid through the stuffing box. On the forward stroke, however, there is no pressure of motive fluid in the front end of the cylinder. Hence the pressure upon the packing in the stuffing box is removed, the pressure of the packing upon the rod is relaxed and there is no excessive friction to interfere with the free forward movement of the piston. It should be understood also that my invention is applicable to other forms of impact tools as well as rock drills, that is to say, it may be applied to tools for calking or chipping metal, for dressing stone or the like, whether the stem or rod be connected to the piston as I have illustrated, or whether the piston is in the form of an independent hammer reciprocating in the cylinder and delivering its blows upon a tool stem or rod, suitably mounted in the cylinder head.

Having thus described my invention, I claim and desire to secure by Letters Patent—

1. An impact tool in which are combined a cylinder, a reciprocating piston therein, a duplex valve chest, and two independent longitudinal slide valves, one for controlling the flow of motive fluid to one end of the cylinder, and the other for controlling the flow of the fluid to the opposite end of the cylinder, substantially as specified.

2. An impact tool in which are combined a cylinder, a piston adapted to reciprocate therein, a valve chest having two independent valve chambers each containing a valve independent of the valve in the other chamber, one valve controlling the flow of motive fluid to one end of the cylinder, and the other controlling the flow of fluid to the opposite end of the cylinder, each end of each valve chamber having a drainage port, and the piston being constructed to open and close these drainage ports as it reciprocates so as to provide for the independent operation of each valve, substantially as specified.

3. An impact tool in which are combined a cylinder, a grooved piston reciprocating therein, valve mechanism for controlling the flow of motive fluid first to one end of the cylinder, and then to the other end of the same, and drainage ports for the valve chamber or chambers, the ends of the piston being adapted to open and close the drainage ports as said piston reciprocates and the said ports and piston ends being so disposed in respect to each other as to provide for the admission of motive fluid to the rear end of the cylinder at an earlier period in the rear stroke than it is admitted to the forward end of the cylinder on the forward stroke, substantially as specified.

4. An impact tool in which are combined a cylinder, a grooved piston reciprocating therein, and having ends of different lengths, valve mechanism for controlling the flow of motive fluid first to one end of the cylinder and then to the other end of the same, and drainage ports for the valve chamber or chambers, the ends of the piston being adapted to open and close the drainage ports as said piston reciprocates, substantially as specified.

5. An impact tool in which are combined a cylinder, a grooved piston reciprocating therein, a duplex valve chest having independent valves, one for controlling the flow of motive fluid to one end of the cylinder, and the other for controlling the flow of motive fluid to the other end of the cylinder, and drainage ports communicating with each end of each valve chamber, said drainage ports and the ends of the piston being so disposed in respect to each other as to provide for the admission of motive fluid to the rear end of the cylinder at an earlier period in the rear stroke than it is admitted to the forward end of the cylinder on the forward stroke, substantially as specified.

6. An impact tool in which are combined a cylinder, a grooved piston reciprocating therein and having ends of different lengths, a duplex valve chest having independent valves, one for controlling the flow of motive fluid to one end of the cylinder, and the other for controlling the flow of motive fluid to the other end of the cylinder, and drainage ports for each end of each valve chamber, the ends of the piston being adapted to open and close said drainage ports as the piston reciprocates, substantially as specified.

7. An impact tool in which are combined a cylinder, a grooved piston reciprocating therein, a duplex valve chest having independent valves, one for controlling the flow of motive fluid to one end of the cylinder, and the other for controlling the flow of motive fluid to the other end of the cylinder, and drainage ports communicating at each end of each valve chamber, the piston being adapted in its travel to operate in conjunction first with the drainage ports of one valve chamber, and at a subsequent point in the stroke with the drainage ports of the other valve chamber, one port of each chamber being always open to the exhaust when the other port is closed, and the change in conditions being simultaneously effected, substantially as specified.

8. An impact tool in which are combined a cylinder having independent inlet and exhaust ports, a piston adapted to reciprocate in said cylinder, a valve structure having drainage ports communicating with the opposite ends of the valve chamber or chambers, and adapted to be opened and closed by the piston as it reciprocates, and drainage exhaust ports, substantially as specified.

9. An impact tool in which are combined a cylinder, a piston adapted to reciprocate therein, a valve chest having a reciprocating slide valve for controlling the flow of motive fluid, elastic buffer plugs carried by the opposite ends of the valve, and one or more adjustable set screws each serving by contact with an elastic buffer plug of the valve to limit the movement of said valve and regulate the area of port opening due to such movement, substantially as specified.

10. An impact tool in which are combined a cylinder, a plunger adapted to reciprocate therein, a cylinder head having a stuffing box with movable follower bearing solely on the packing, and a washer interposed between the cylinder head and an internal rib or shoulder on the cylinder, said washer being so loosely fitted to the tool stem or rod as to permit of the leakage of motive fluid between the same to act upon the follower, substantially as specified.

11. An impact tool in which are combined a cylinder, a piston adapted to reciprocate therein, a cylinder head having a stuffing box with movable follower bearing solely on the packing, and a cushioning ring and washer interposed between the cylinder head and an internal rib or shoulder on the cylinder, said cushioning ring and washer being so loosely fitted to the piston rod as to permit the leakage of motive fluid between the same to act upon the follower, substantially as specified.

12. An impact tool in which are combined a cylinder, a grooved piston reciprocating therein, ports for governing the admission of motive fluid to each end of the cylinder, and exhaust ports independent of the inlet ports, the groove in the piston and the inlet governing ports being so arranged with respect to each other that after the admission of the motive fluid has been cut off from one end of the cylinder, motive fluid will not be admitted to the opposite end of the cylinder until at a subsequent point in the stroke.

In testimony whereof I have signed my name to this specification in the presence of two subscribing witnesses.

THOMAS H. PHILLIPS.

Witnesses:
JOSEPH H. KLEIN,
HARRY SMITH.